(12) United States Patent
Watanabe et al.

(10) Patent No.: US 6,404,474 B1
(45) Date of Patent: Jun. 11, 2002

(54) HORIZONTAL ELECTRIC FIELD LCD WITH INCREASED CAPACITANCE BETWEEN PIXEL AND COMMON ELECTRODES

(75) Inventors: Makoto Watanabe; Takahiko Watanabe, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/357,060

(22) Filed: Jul. 19, 1999

(30) Foreign Application Priority Data

Jul. 24, 1998 (JP) .......................................... 10-209148

(51) Int. Cl.[7] .......................................... G02F 1/1343
(52) U.S. Cl. .......................................... 349/141; 349/39
(58) Field of Search .......................... 349/141, 38, 39, 349/140, 139

(56) References Cited

U.S. PATENT DOCUMENTS 6,111,626 A * 8/2000 Watanabe et al. ........... 349/141
6,259,503 B1 * 7/2001 Watanabe et al. ........... 349/141

FOREIGN PATENT DOCUMENTS

| JP | 2-44317 | 2/1990 |
| JP | 3-196020 | 8/1991 |
| JP | 06160902 A | 6/1994 |
| JP | 07013196 A | 1/1995 |
| JP | 07270821 A | 10/1995 |

* cited by examiner

Primary Examiner—Toan Ton
Assistant Examiner—Andrew Schechter
(74) Attorney, Agent, or Firm—Scully, Scott, Murphy & Presser

(57) ABSTRACT

An active matrix type liquid crystal display device in a horizontal electric field scheme having a favorable holding characteristic and a reduced feedthrough voltage as well as satisfactory display evenness and reliability with an aperture ratio maintained is disclosed. The device comprises, on the first substrate, a plurality of scanning lines and a plurality of signal lines orthogonal to one another, a thin film transistor intersection of a scanning line and a signal line, the common electrode extending substantially parallel to the scanning lines and having a plurality of comb-tooth projections extending toward the scanning lines, the pixel electrodes formed substantially parallel to the comb-tooth projections in gaps between the adjacent comb-tooth projections of the common electrodes, the interlayer insulating film separating the common electrodes and the pixel electrodes, and a first alignment film formed above the pixel electrode interposed by a protective insulating film. On the second substrate, a black matrix provided with openings provided near in areas opposite to the pixel electrodes, and a second alignment film are provided as well as a dielectric with a predetermined premitivity disposed in the areas in the substrate sandwiched between the comb-tooth projections s of a common electrode and a pixel electrode.

16 Claims, 20 Drawing Sheets

HORIZONTAL ELECTRIC FIELD LCD WITH INCREASED CAPACITANCE BETWEEN PIXEL AND COMMON ELECTRODES

BACKGROUND OF THE INVENTION

1. Field of the Invention

The present invention relates to an active matrix type liquid crystal display device in a horizontal electric field driving scheme.

2. Description of the Related Art

Conventionally, common liquid crystal display devices have been of a type in which an electric field acting in a direction perpendicular to a substrate surface changes orientation of the director (molecular axis) of liquid crystal molecules, thereby controlling transmittance of light to achieve display of an image on a panel (hereinafter referred to as vertical electric field driving type). A TN (Twisted Nematic) mode is a representative mode of the vertical electric field driving type.

In liquid crystal display devices of the vertical electric field driving type, however, the director is oriented perpendicularly to the substrate surface at the application of an electric field. As a result, a refractive index varies depending on a viewing direction causing high dependency upon a viewing angle, so that display devices of this type are inappropriate for applications requiring a wide viewing angle.

To address this, in recent years, research and development have been advanced for liquid crystal display devices of a type in which the director of liquid crystal molecules is oriented parallel to a substrate surface and an electric field acts in a direction parallel to the substrate surface to rotate the director within a plane parallel to the substrate, thereby controlling transmittance of light to achieve display of an image (hereinafter referred to as horizontal electric field driving type). Since liquid crystal display devices of the horizontal electric field driving type exhibit substantially reduced variations in a refractive index depending on a viewing direction, display performance can be obtained with high image quality and a wide field of view.

A prior art active matrix liquid crystal display device of the horizontal electric field driving type will be hereinafter described with reference to FIG. 1 through FIG. 9.

Referring to FIG. 1, there is shown a display pixel which comprises scanning line 502 for connection to an external driving circuit, signal line 103, common electrode 106, thin film transistor 503 serving as a switching element, and pixel electrode 104.

As shown in FIG. 2, on TFT side glass substrate 102, common electrode 106 is formed with pixel electrode 104 and signal line 103 formed thereon interposed by interlayer insulating film 130. At the time of formation, pixel electrode 104 and common electrode 106 are disposed alternately. These electrodes are covered with protective insulating film 110 on which TFT side alignment film 120 required for aligning liquid crystal 107 is applied and subjected to a rubbing treatment. In this manner, TFT side substrate 100 is formed.

On opposite side glass substrate 101, light shield film 203 is provided in matrix form on which color layer 142 required for displaying colors is formed. Additionally provided on color layer 142 is planarization film 202 for planarizing the surface of the opposite side substrate on which opposite side alignment film 122 required for aligning liquid crystal 107 is applied and subjected to the rubbing treatment. The direction of the rubbing treatment is opposite to that of TFT side substrate 100. In this manner, opposite side substrate 200 is formed.

Liquid crystal 107 and spacer 302 are filled between TFT side substrate 100 and opposite side substrate 200. The gap between both substrates is determined by the diameter of spacer 302. Finally, TFT side polarizer 145 is stuck on the surface of TFT side glass substrate 102 which has no electric pattern formed thereon such that the transmission axis thereof is orthogonal to the rubbing direction. Opposite side polarizer 143 is also stuck on the surface of opposite side glass substrate 101 on which no patterns are formed such that the transmission axis thereof is orthogonal to the transmission axis direction of TFT side polarizing sheet 145. With the aforementioned process, liquid crystal display panel 300 is completed.

Thereafter, liquid crystal display panel 300 is disposed above backlight 400 and connected to driving circuit 500 as shown in FIG. 3.

Next, the operation of the liquid crystal display device will be described with reference to FIG. 4 and FIG. 5. FIG. 4 is a circuit diagram showing an equivalent circuit of the prior art liquid crystal display device, while FIG. 5 is a graph showing waveforms of voltages applied to a scanning line, a signal line, and a common electrode, and a waveform of a pixel electrode voltage. It should be noted that Vfd in FIG. 5 is referred to as a feedthrough voltage. The voltage applied to the common electrode is set such that $\Delta V+$ and $\Delta V-$, which represent amplitudes in positive and negative frames of the pixel electrode voltage when an amplitude of a video signal corresponds to a halftone, are equal to each other.

Description is made of the flow of electric charge in a unit element and light switching of the liquid crystal. An ON/OFF signal on scanning line 502 provided in the same layer as common electrode 106 in FIG. 1 causes thin film transistor 503 to switch. When thin film transistor 503 is ON, electric charge flows from signal line 103 into pixel electrode 104. A constant direct-current voltage is always applied to common electrode 106 as described with reference to FIG. 5. In terms of an electric circuit, pixel electrode 104 and common electrode 106 form capacitances $C_{LC}$, $C_{GL}$, and $C_{SC}$ across liquid crystal 107, TFT side glass substrate 102, and interlayer insulating film 130, respectively, as shown in FIG. 4.

Thereafter, the charge is held by the capacitances even after thin film transistor 503 turns OFF. The held charge generates a potential difference between pixel electrode 104 and common electrode 106 to create a horizontal electric field parallel to the glass substrate which rotates the director of liquid crystal 107 to change retardation for liquid crystal display panel 300. The changed retardation causes a change in panel transmittance of incident light emitted from backlight 400 shown in FIG. 3 in portions which are not provided with light shield film 203, pixel electrode 104, common electrode 106, scanning line 502, and thin film transistor 503. FIG. 6 shows a relationship between a potential difference between the common electrode and the pixel electrode and the panel transmittance.

The aforementioned prior art liquid crystal display device suffers two disadvantages described below.

A first disadvantage is that the panel transmittance is lowered and uneven display is generated as a charge holding time is reduced. The reason thereof will be described in the following.

Specifically, in the aforementioned prior art liquid crystal display device, although it is desirable that electric charge held by capacitances $C_{LC}$, $C_{GL}$, and $C_{SC}$ is completely held when thin film transistor 503 turns OFF, the amount of the charge is actually diminished with a certain time constant in terms of an electric circuit. The time constant τoff is approximately represented as equation (1):

$$\tau_{off} \approx R_{off}(C_{LC}+C_{GL}+C_{SC}+C_{GS}) \quad (1)$$

where Roff represents a resistance of thin film transistor 503 at OFF and $C_{GS}$ represents a gate-source capacitance of thin film transistor 503 shown in FIG. 7.

In a liquid crystal display device of the horizontal electric field scheme, $C_{LC}$ and $C_{GL}$ are smaller than those in a liquid crystal display device of the vertical electric field scheme since they are fringe capacitances. Roff is a constant value determined by a process limit of the thin film transistor and $C_{GS}$ is determined by a size of the thin film transistor, both of which have a low degree of flexibility. Additionally, since $C_{SC}$ corresponds to an overlapping portion between pixel electrode 104 and common electrode 106, an increased area of the overlapping portion leads to a reduced aperture ratio.

When a high light intensity is set for the backlight, a light leakage current is increased resulting from light incident on a back channel of the thin film transistor and the formation of holes in n-i-n parasitic resistance portions as shown in FIG. 7. The leakage of the pixel charge causes a reduction in the potential difference between the common electrode and the pixel electrode, thus lowering the panel transmittance in accordance with the curve in FIG. 6. In addition, since the amount of the light leakage current varies depending on manufacturing variations in the thin film transistor, uneven brightness is likely to occur due to variations in the light leakage current over a display surface.

In addition to the case in which electric charge is leaked through the thin film transistor, when a liquid crystal material with a low resistivity is used, i.e. when a liquid crystal material including multiple ions is used, the ions in the liquid crystal form an electric double layer a while after the writing of charge into the pixel electrode to apparently increase $C_{LC}$. Since the charge held in the pixel electrode may be considered constant after the thin film transistor turns OFF, the reduction leads to a voltage drop between the pixel electrode and the common electrode. The voltage drop is approximately proportional to the following parameter x referred to as a pixel capacitance ratio:

$$\text{Voltage drop} \propto x = \frac{C_{LC}}{C_{GS}+C_{LC}+C_{GL}+C_{SC}} \quad (2)$$

When a sufficiently high $C_{SC}$ can not be set, it is expected that the voltage drop in this model is increased, in which case the panel transmittance is also reduced.

In this manner, an active matrix liquid crystal display device in the horizontal electric field scheme causes a disadvantage that it is difficult to obtain a holding characteristic similar to that of an active matrix liquid crystal display device in the vertical electric field scheme with the aperture ratio maintained, thereby making it difficult to suppress a reduction in the panel transmittance and the generation of uneven display.

A second disadvantage is that enameling and image blotching are generated after long continuous use. The reason thereof will be described in the following.

Specifically, the feedthrough voltage of the thin film transistor is approximately represented as equation (3). Since the denominator in equation (3) is small in a liquid crystal display device of the horizontal electrical scheme, an increased Vfd is exhibited. Additionally, the proportion of $C_{LC}$ in the entire capacitance is higher than that for the vertical electric field scheme. For this reason, when a level of gradation is changed, i.e. when $C_{LC}$ is changed, Vfd varies greatly as compared with the vertical electric field scheme. The increased Vfd means that a difference occurs in Vfd in right and left portions of a display unit when a scanning signal waveform is delayed in a large panel or the like.

$$V_{fd} = \frac{C_{GS}}{C_{GS}+C_{LC}+C_{SC}+C_{GL}} \times (V_{G-ON} - V_{G-OFF}) \quad (3)$$

As mentioned above, since a uniform and constant direct-current voltage is applied to the common electrode over the display surface, the aforementioned phenomenon causes increased variations in direct components of the voltage between the pixel electrode and the common electrode both in the surface and between levels of gradation. This results in a problem of the generation of enameling and image blotching due to material deterioration caused by a direct-current voltage applied to a liquid crystal material, and uneven brightness in the display surface due to a difference in effective voltages applied to the liquid crystal in the display surface.

FIG. 8 is a plan view showing a unit pixel in another prior art, while FIG. 9 is a sectional view taken along the b–b' line in FIG. 8.

The unit pixel shown in FIG. 8 and FIG. 9 is similar to that of the active matrix liquid crystal display device in FIG. 1 and FIG. 2 except that an end portion of pixel electrode 104 is extended to overlap with common electrode 106.

SUMMARY OF THE INVENTION

The present invention was made in view of the aforementioned disadvantages, and it is a primary object thereof to provide an active matrix type liquid crystal display device which provides a favorable holding characteristic and a reduced feedthrough voltage, as well as satisfactory display evenness and reliability, with an aperture ratio maintained.

The active matrix type liquid crystal display device according to the present invention has two opposing transparent insulating substrates and liquid crystal interposed between the opposing substrates. On the first substrate, there are provided a plurality of scanning lines and a plurality of signal lines orthogonal to one another, thin film transistors, a common electrodes, pixel electrodes, and a first alignment film.

A thin film transistor is formed near each intersection of a scanning line and a signal line. The common electrodes extend substantially parallel to the scanning lines and each has a plurality of comb-tooth projections extending toward the scanning lines. The pixel electrodes are formed substantially parallel to the comb-tooth projections in the gaps between the adjacent comb-tooth projections of a common electrode when viewing the substrate from the normal direction and a portion of a pixel electrode is opposite to a common electrode interposed by an interlayer insulating film. The first alignment film is formed above the common electrodes interposed by the protective insulating film.

On the second substrate, there are provided a black matrix provided with openings in areas opposite to the pixel electrodes and a second alignment film.

The liquid crystal is controlled by generating an electric field substantially parallel to the layer of liquid crystal with a voltage applied between the pixel electrodes and the common electrodes.

The active matrix type liquid crystal display device according to the present invention further comprises accumulated capacitance increasing means for obtaining an accumulated capacitance between the pixel electrodes and the common electrodes larger than an accumulated capacitance generated in a case where the interlayer insulating film has an even thickness and is of a flat structure.

Additionally, in the present invention, the accumulated capacitance increasing means may be of at least one or more of the following structures:

(1) a structure in which a dielectric with a predetermined permittivity is disposed in the area of the first substrate that are sandwiched between the comb-tooth projections of a common electrode and a pixel electrode when viewing the substrate from the normal direction;

(2) a structure in which a recess is formed in at least one portion of the upper surface area of the first substrate where a common electrode and a pixel electrode overlap when the substrate is viewed from the direction of the normal direction and an interlayer insulating film is interposed between the common electrode and the pixel electrode on a wall surface of the recess;

(3) a structure in which an interlayer insulating film interposed between the common electrodes and the pixel electrodes is formed thinner in at least one portion of an area where a common electrode and a pixel electrode overlap than in other areas; and (4) a structure in which the interlayer insulating film interposed between the common electrode and the pixel electrodes is formed of a dielectric with a predetermined permittivity in at least one portion of an area where a common electrode and a pixel electrode overlap.

Furthermore, in the present invention, the interlayer insulating film or the dielectric with a predetermined permittivity may be formed from a transparent dielectric preferably titanium oxide having a permittivity higher than the first substrate and the other insulating films formed on the first substrate.

The above and other object, features, and advantages of the present invention will become apparent from the following descriptions based on the accompanying drawings which illustrate examples of preferred embodiments of the present invention.

DETAILED DESCRIPTION OF THE PREFERRED EMBODIMENTS

Figure 1:
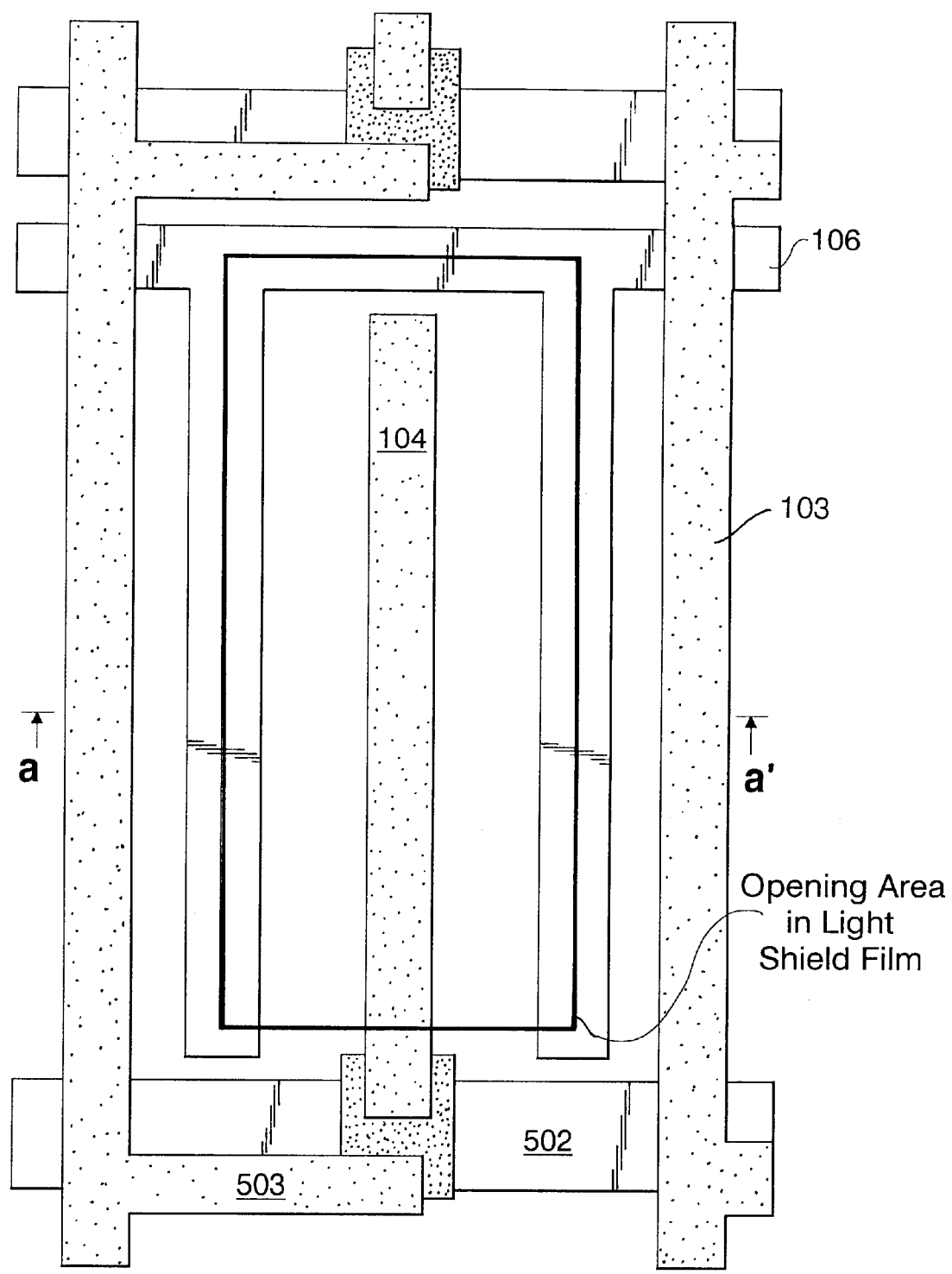
FIG. 1 is a plan view showing a unit pixel of a prior art liquid crystal display device.

A first embodiment of an active matrix type liquid crystal display device according to the present invention will be described with reference to FIG. 10. The active matrix type liquid crystal display device according to the present invention employs the horizontal electric field scheme and has two opposing transparent insulating substrates.

The first substrate is provided with a plurality of scanning lines 502 and a plurality of signal lines 103 orthogonal to one another, thin film transistor 503, common electrode 106, pixel electrode 104, interlayer insulating film 130 separating common electrode 106 and pixel electrode 104, above which a first alignment film (not shown) is formed interposed by through protective insulating film 110. Thin film transistor 503 is formed near each intersection of scanning line 502 and signal line 103. Common electrode 106 extends substantially parallel to the scanning line 502 and has a plurality of comb-tooth projections. Pixel electrode 104 is formed in the gap between the adjacent comb-tooth projections of the common electrode 106.

Figure 2:
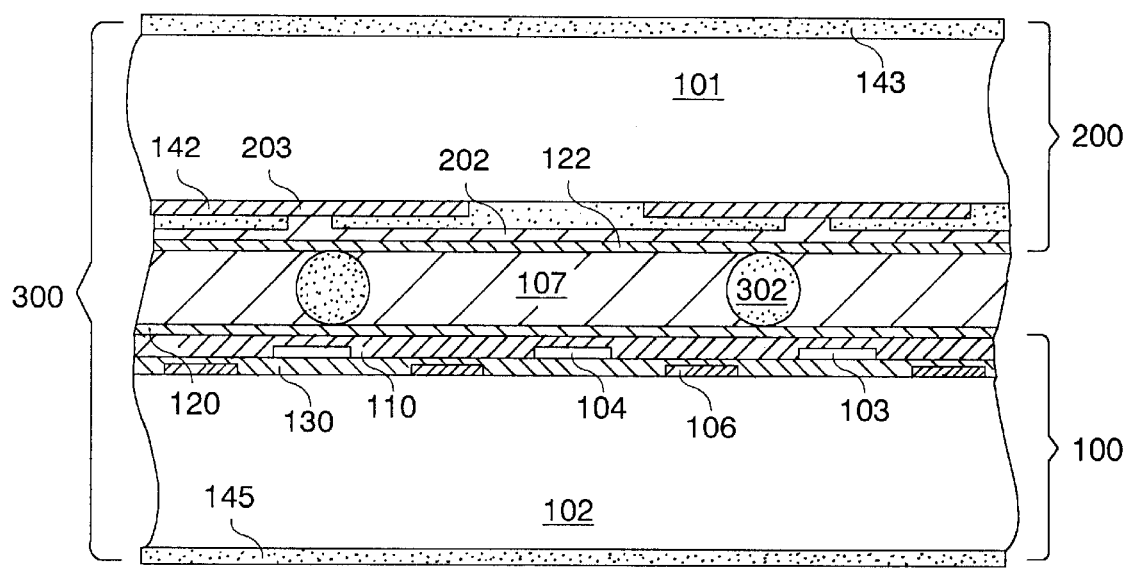
FIG. 2 is a sectional view showing a unit pixel of the prior a liquid crystal display device.
Figure 3:
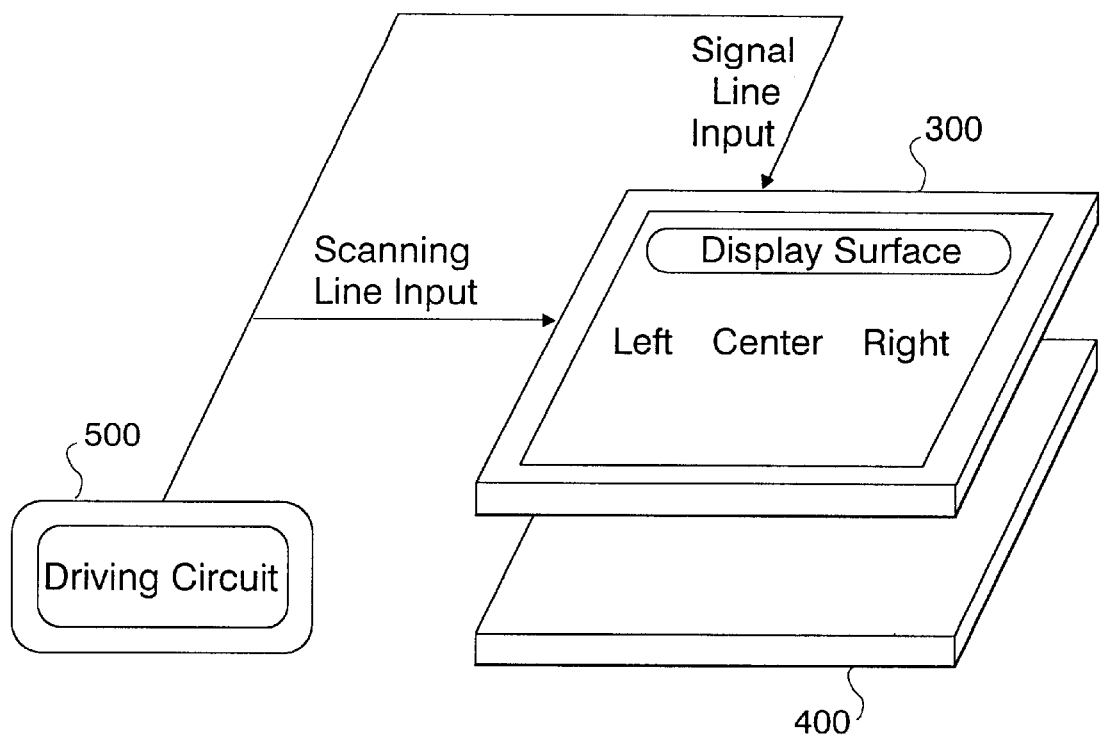
FIG. 3 is a schematic view showing a configuration of a transmission type liquid crystal display device in the prior art.
Figure 4:
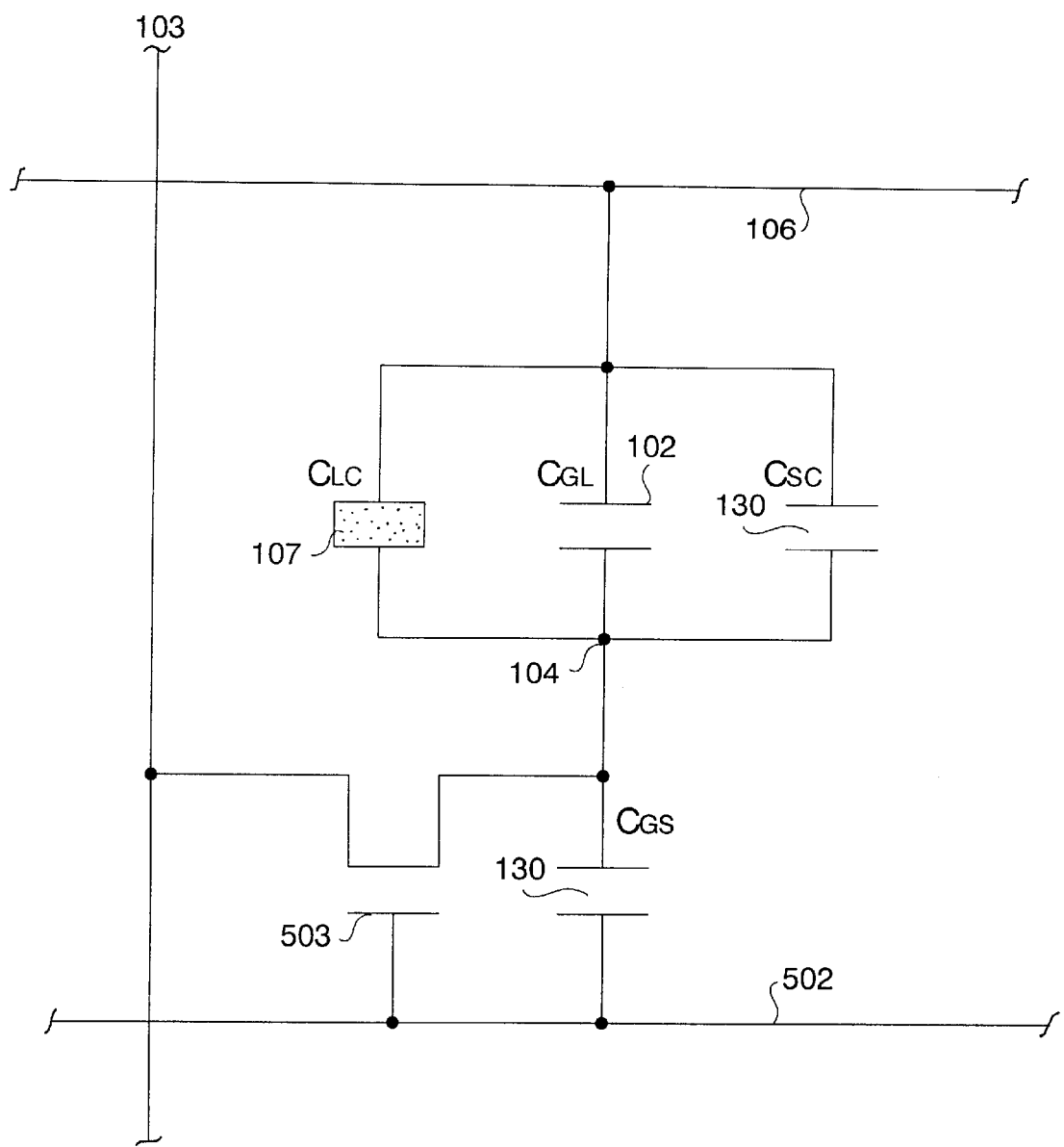
FIG. 4 is a circuit diagram showing an equivalent circuit of a liquid crystal display panel in a horizontal electric field scheme of the prior art.
Figure 5:
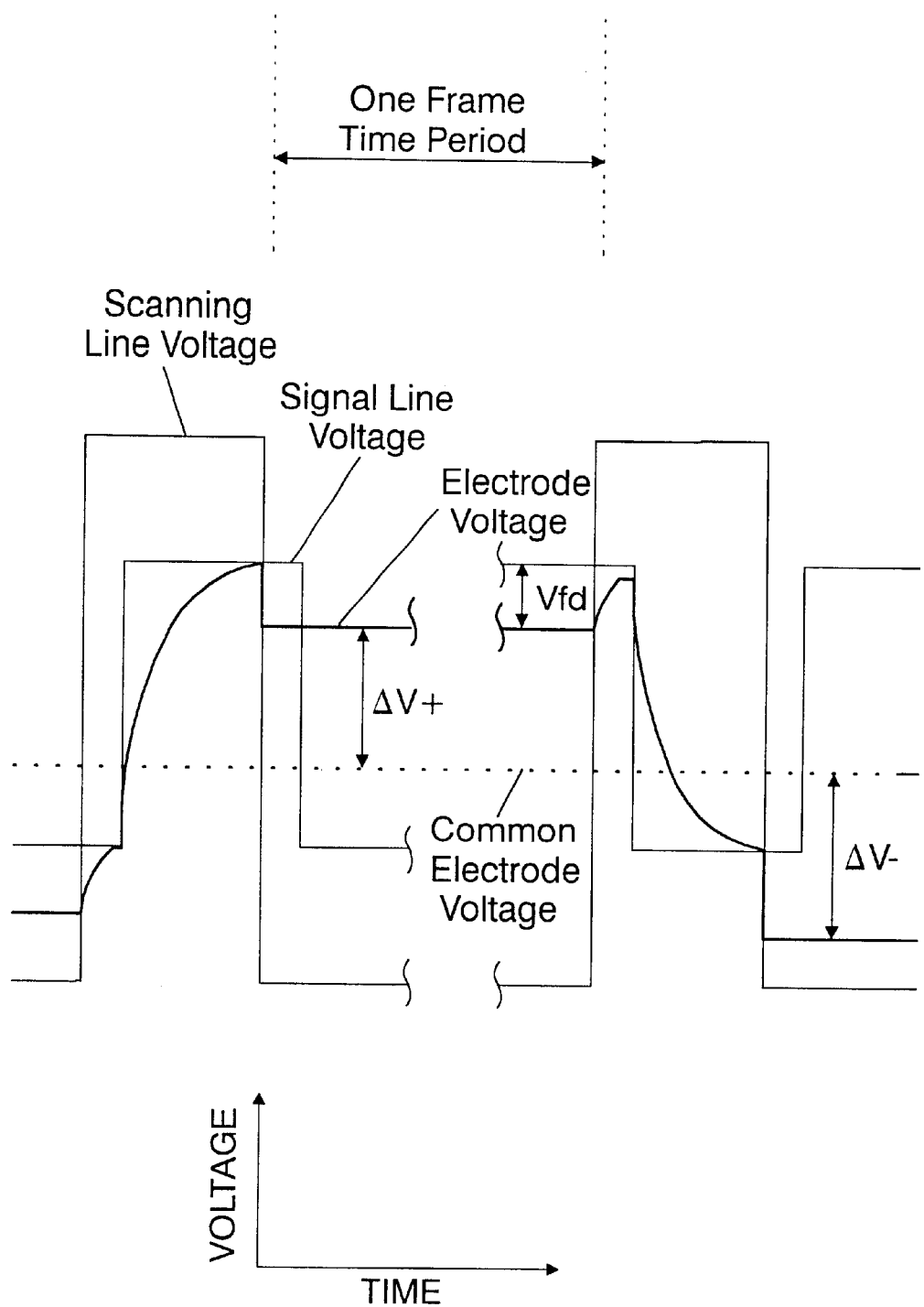
FIG. 5 is a time chart showing signal waveforms of an active matrix type liquid crystal display device of the prior art.
Figure 6:
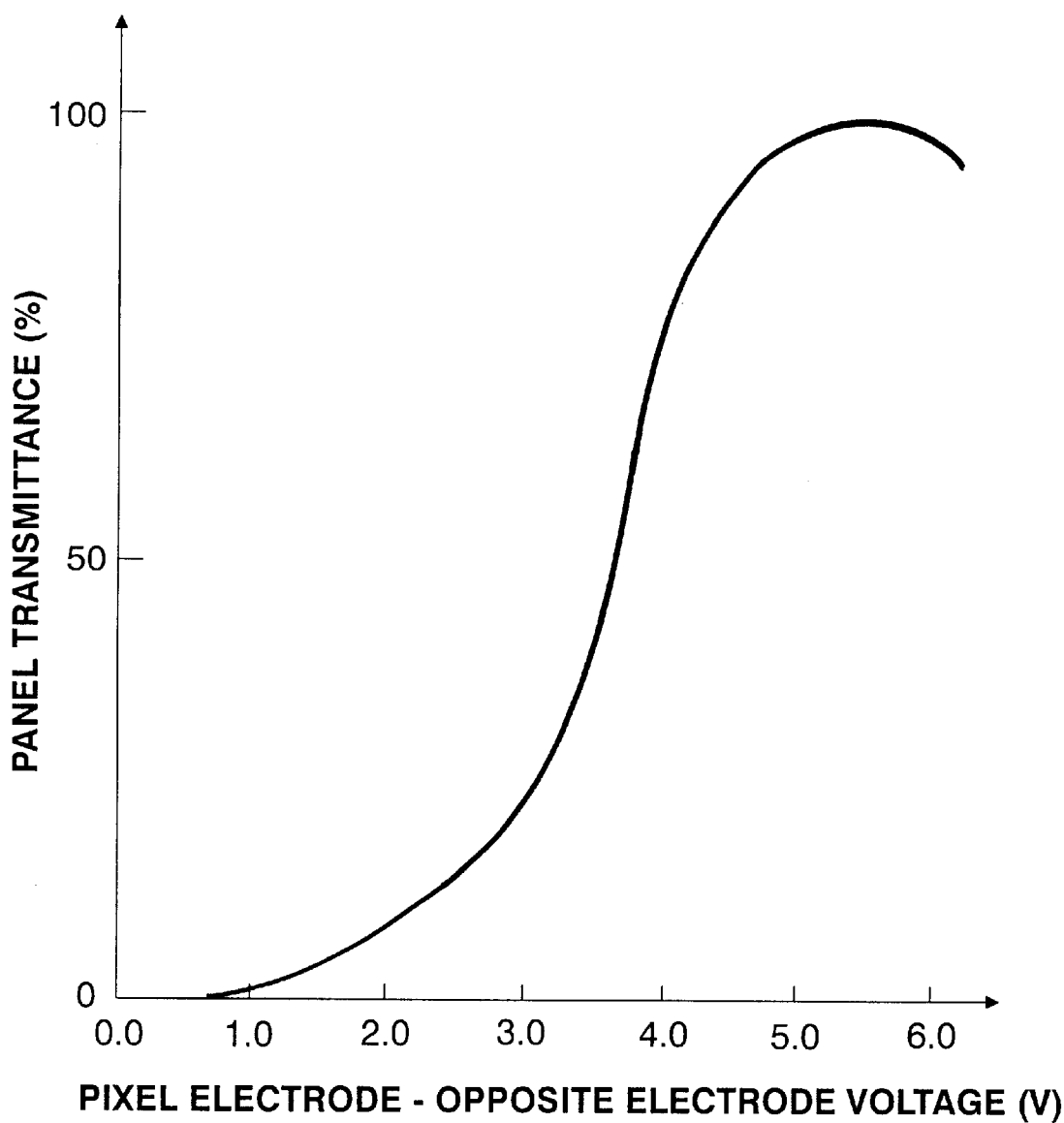
FIG. 6 is a graph showing a voltage-brightness characteristic of the prior art liquid crystal display device.
Figure 7:
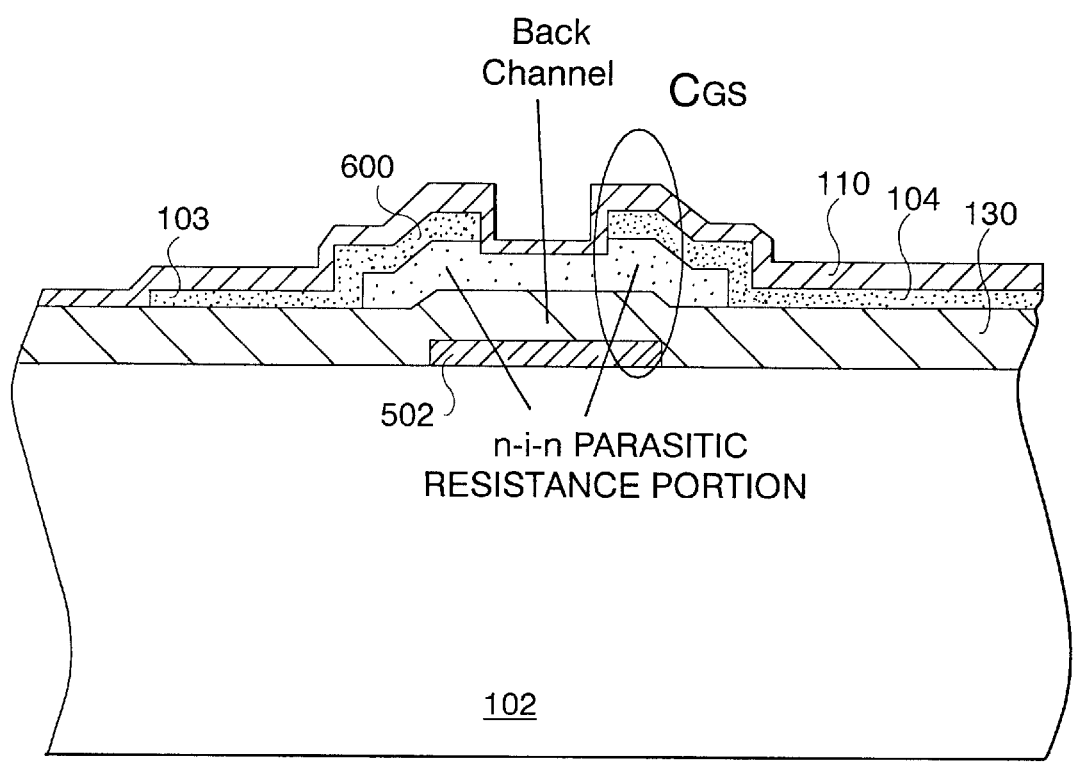
FIG. 7 is a sectional view showing a structure of an inverted staggered structure thin film transistor of the prior art.
Figure 8:
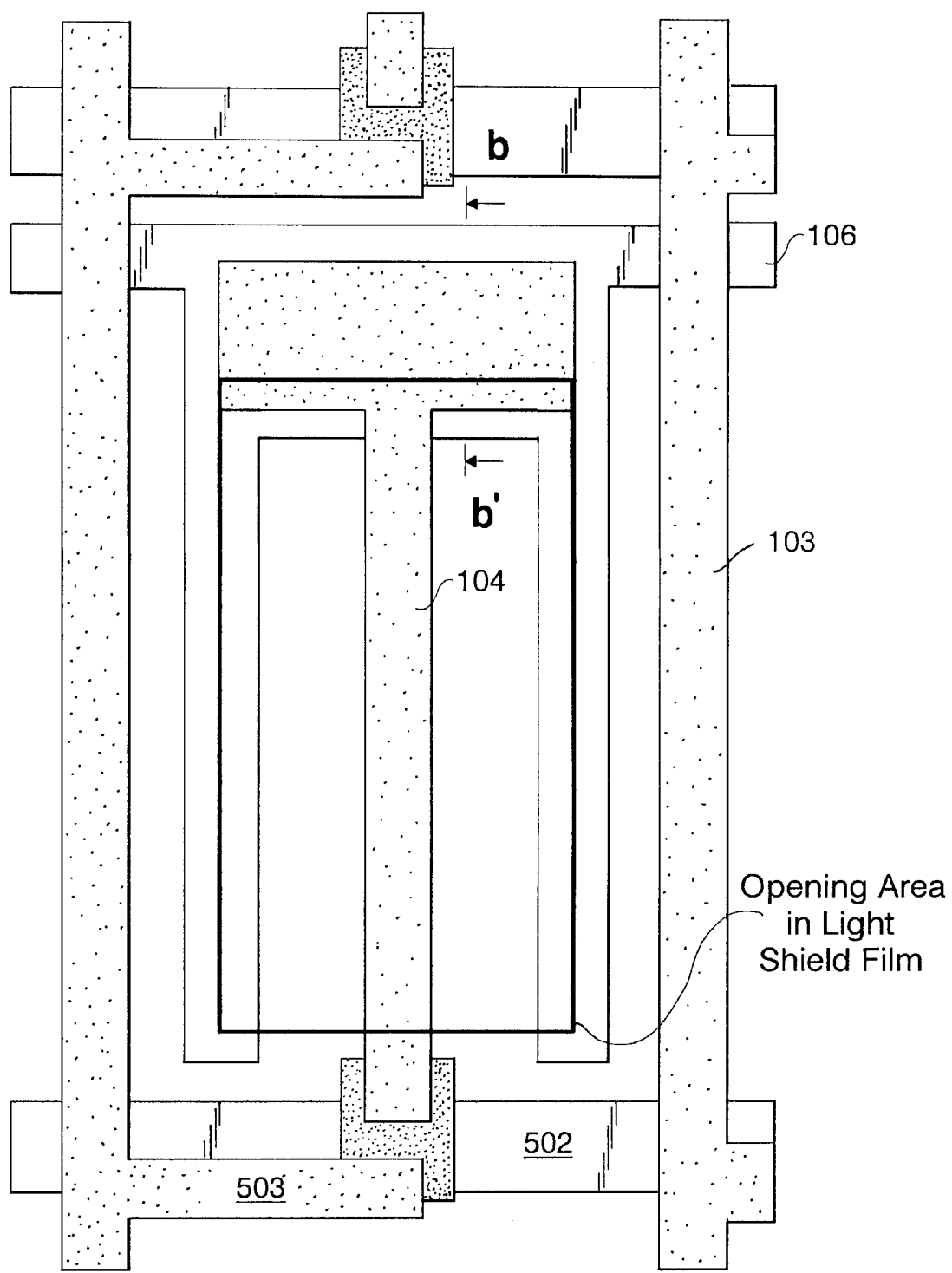
FIG. 8 is a plan view showing another unit pixel of prior art.
Figure 9:
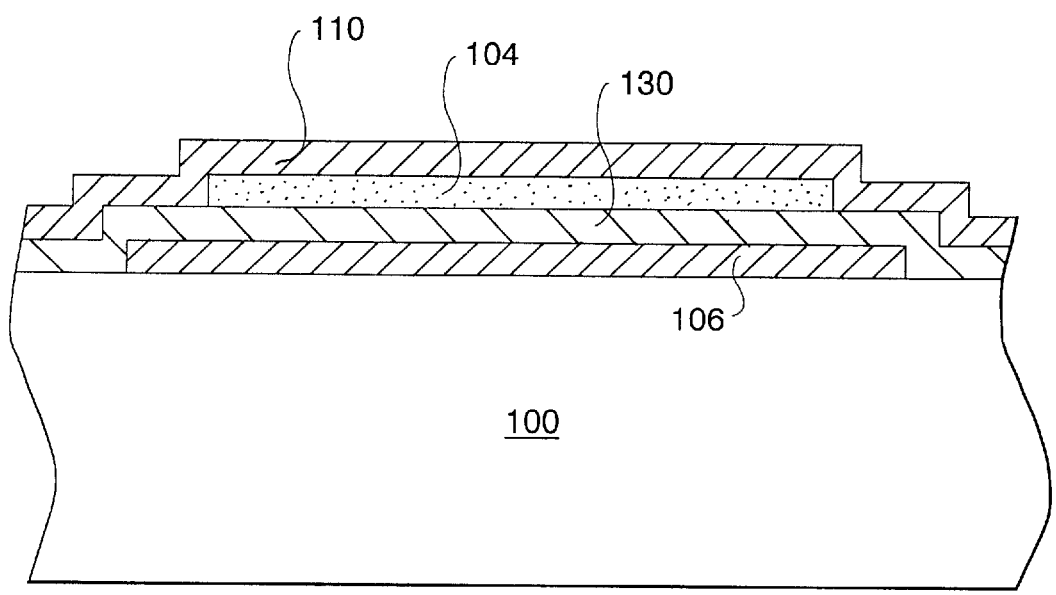
FIG. 9 is a sectional view showing the other unit pixel in the prior art.

A second substrate is provided with a light shield film forming a black matrix which has openings in areas opposite to the pixel electrodes, a planarization film, and a second alignment film, as described in FIG. 2 for the prior art.

Additionally, the active matrix type liquid crystal display device of the horizontal electric field scheme according to the present invention is provided with high permittivity insulating films 230 comprising a transparent dielectric having a predetermined permittivity in the areas of the TFT side glass substrate (the first substrate) which are between the comb-tooth projections of common electrode 106 and pixel electrode 104 viewed from the direction of the normal to the substrate.

The first embodiment of the present invention will be described in further detail with reference to FIG. 10 to FIG. 14.

Figure 11:
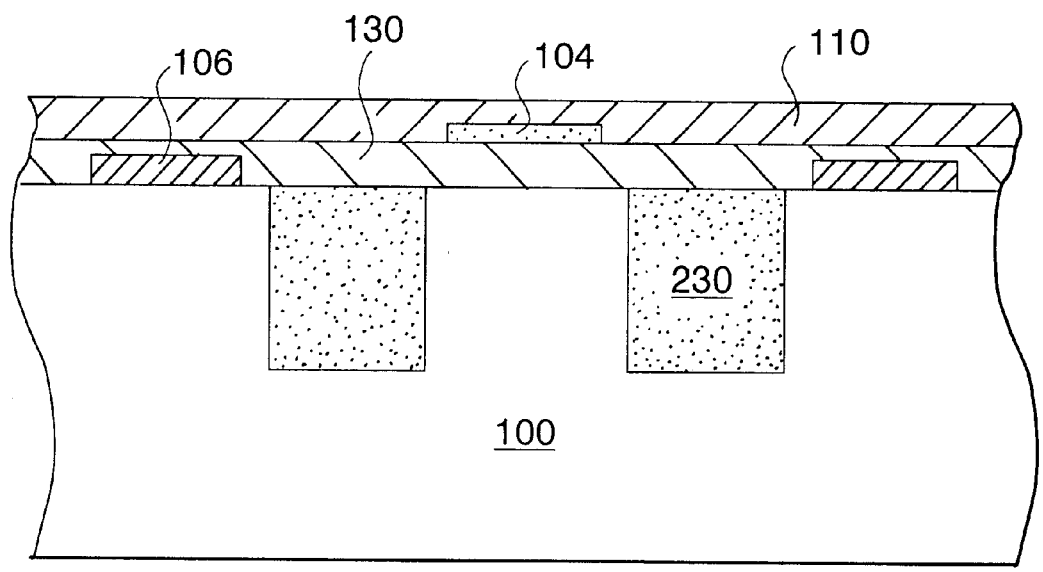
FIG. 11 is a sectional view showing the unit pixel of the liquid crystal display device taken along the line c–c' in FIG. 10.

Referring to FIG. 11, the areas of TFT side glass substrate 100 which are between common electrodes 106 and pixel electrodes 104 are etched to form grooves. Thereafter, transparent dielectric films having a high relative permittivity, for example titanium oxide ($TiO_2$, relative permittivity $\epsilon \approx 85$) are deposited in the grooves. The insulating films are referred to as high permittivity insulating films 230. For a gate insulating film of the thin film transistor, interlayer insulating film 130 is deposited similarly to the prior art in order to obtain the same cross capacitance between lower wiring (scanning line 502, common electrode 106) and upper wiring (signal line 103) and the same electrical characteristics of the thin film transistor as those in the prior art. Other manufacturing steps and configuration are similar to those in the prior art.

Figure 10:
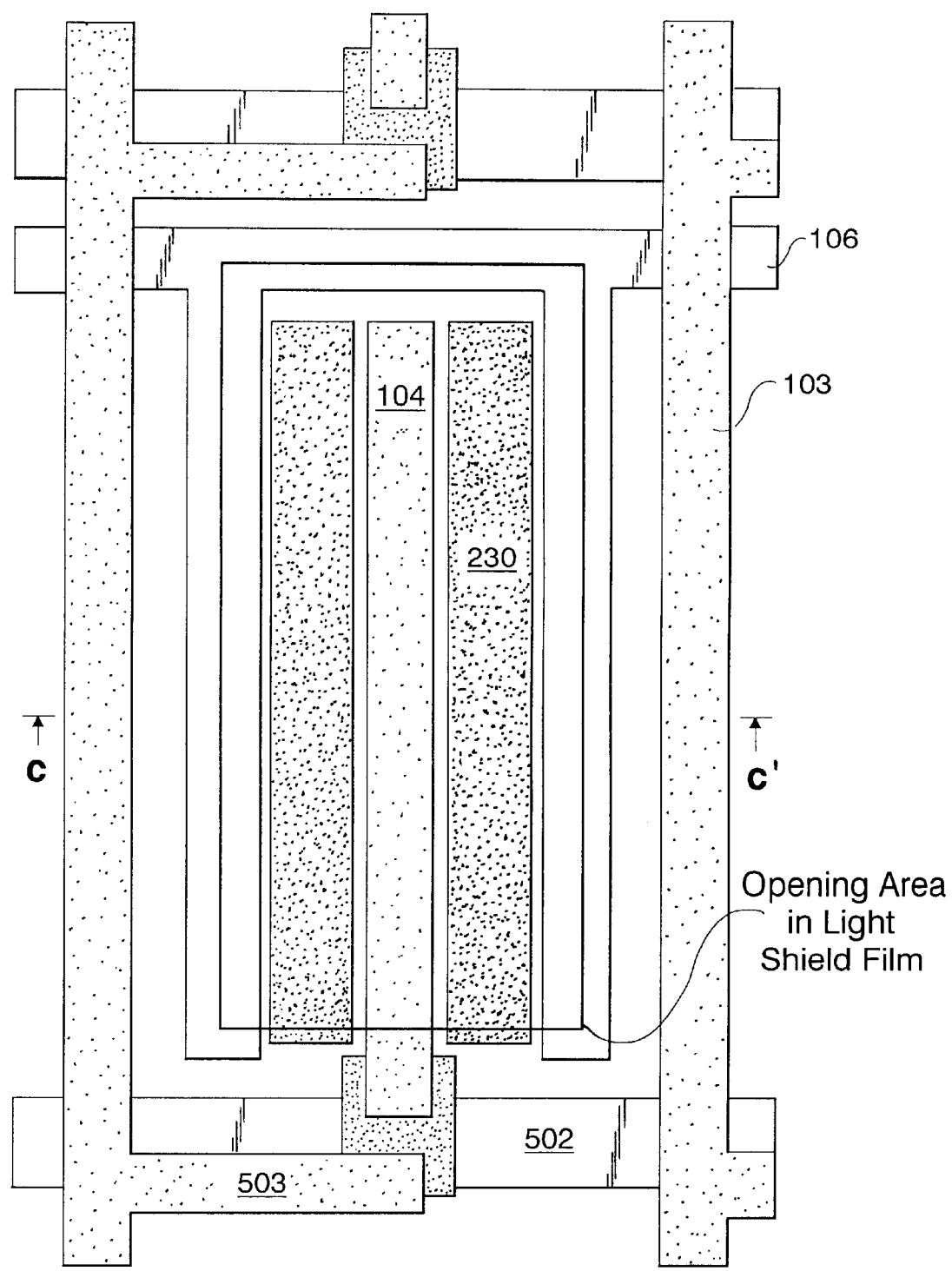
FIG. 10 is a plan view showing a unit pixel of a liquid crystal display device according to a first embodiment of the present invention.

In a liquid crystal display device formed as described above, the aperture ratio is not reduced, as shown in FIG. 10, and electric charge flowing from signal line 103 into pixel electrode 104 through thin film transistor 503 is held with an accumulated capacitance formed with pixel electrode 104, common electrode 106, and the insulating layer. The accumulated capacitance is increased as compared with the prior art due to high permittivity insulating film 230 formed in the groove. As a result, a holding characteristic is improved and a feedthrough voltage is reduced in accordance with the mechanism described in the prior art.

Figure 12:
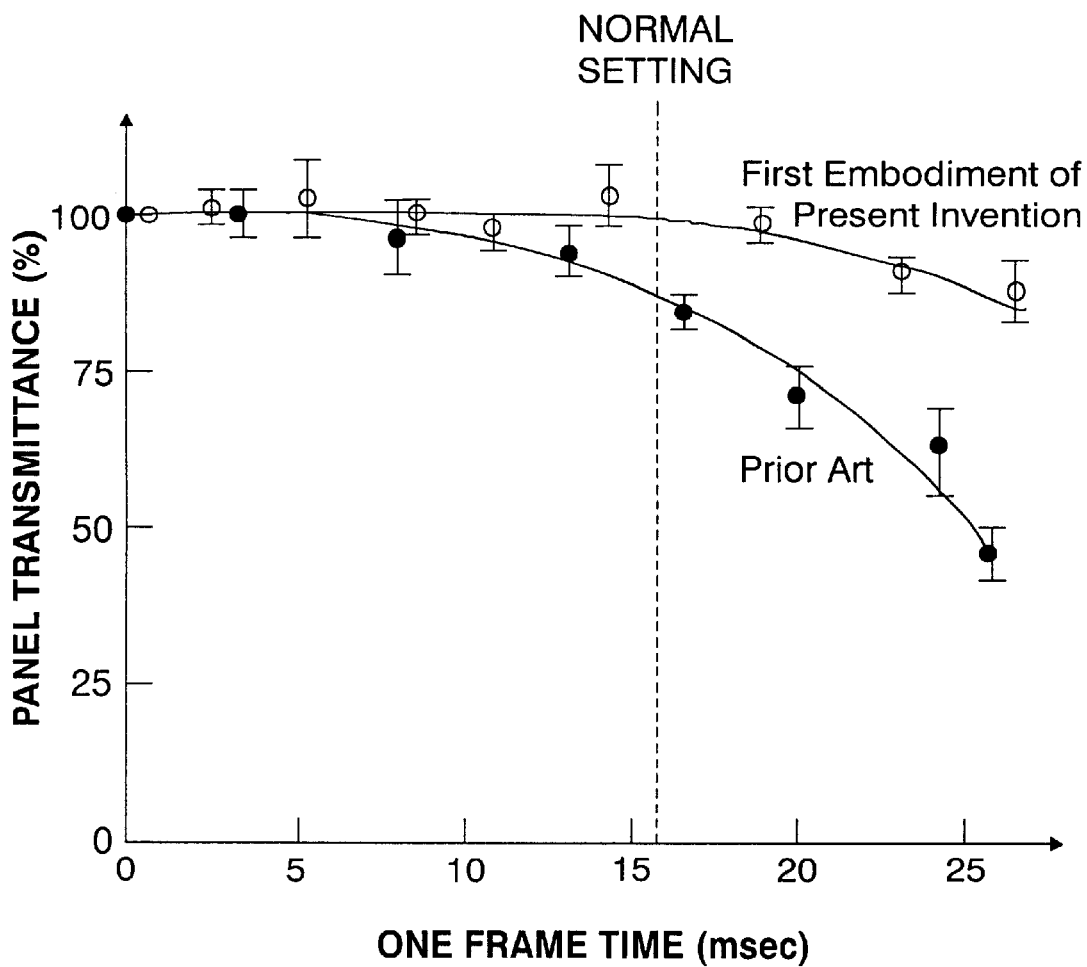
FIG. 12 is a graph showing a holding characteristic of the liquid crystal display device according to the first embodiment of the present invention.
Figure 13:
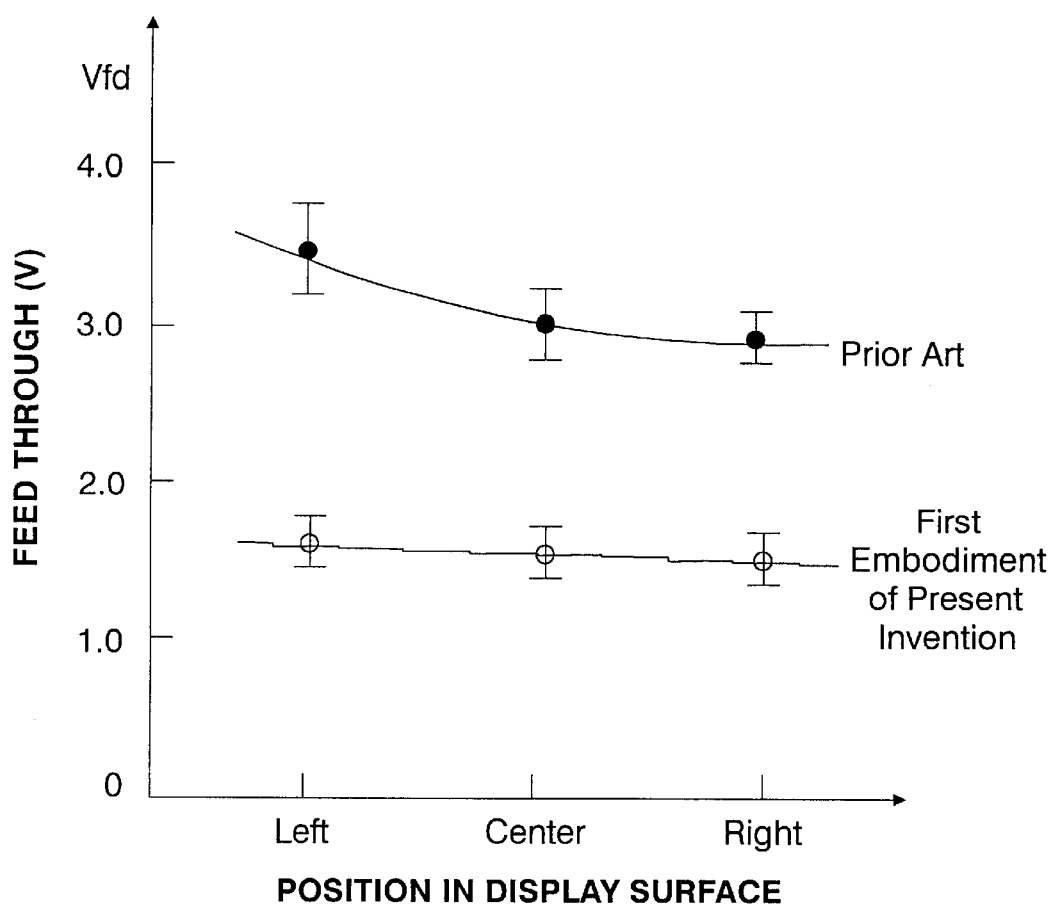
FIG. 13 is a graph showing distribution of a feedthrough voltage in a display surface of the liquid crystal display device according to the first embodiment of the present invention.
Figure 14:
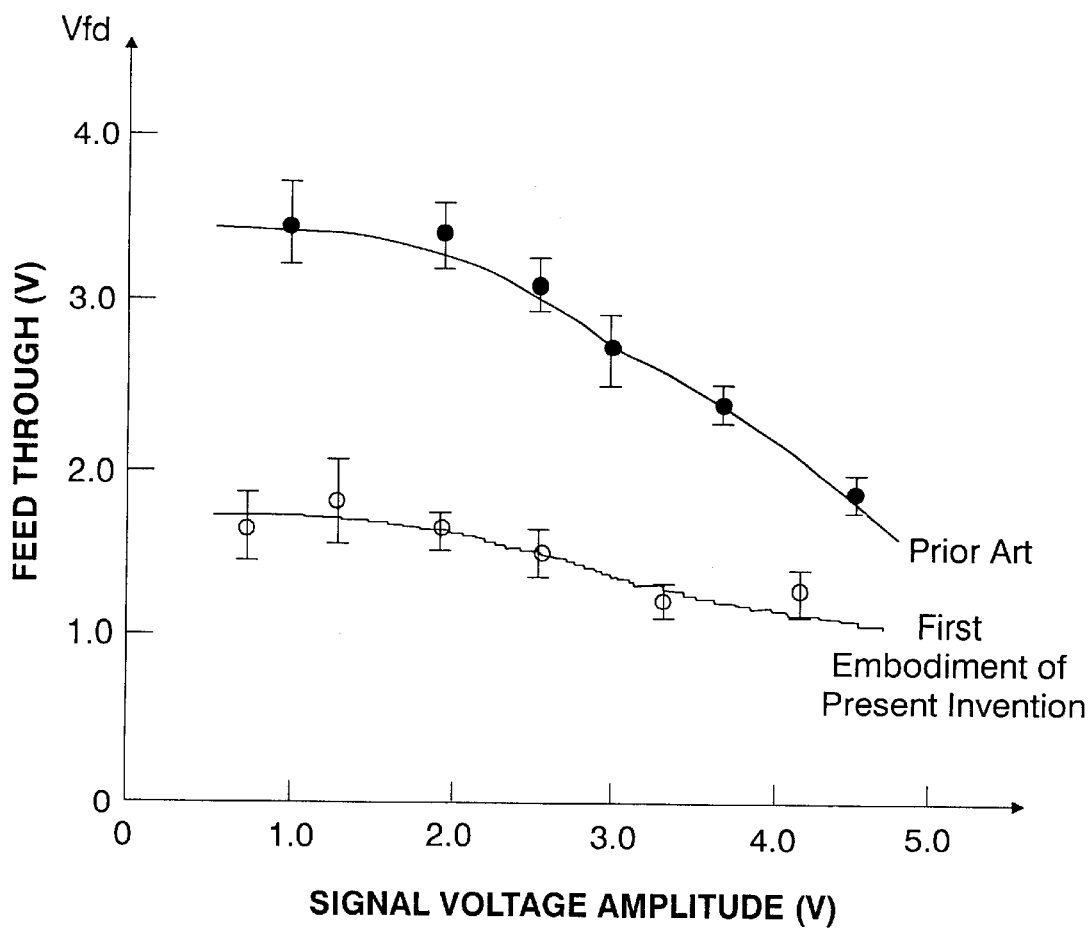
FIG. 14 is a graph showing dependence of the feedthrough voltage upon a signal voltage amplitude of the liquid crystal display device according to the first embodiment of the present invention.

Effects of the aforementioned first embodiment will be described with reference to FIG. 12 to FIG. 14. FIG. 12 is a graph showing a result of measuring the panel transmittance when one frame time, i.e. a holding time is changed. FIG. 13 is a graph showing variations in the feedthrough voltage in a display surface. FIG. 14 is a graph showing dependence of the feedthrough voltage upon a signal voltage. FIG. 12 shows the result assuming that the panel transmittance is 100% when the thin film transistor is always ON.

As shown in FIG. 12, it can be seen that brightness is hardly reduced even with a longer holding time in the embodiment as compared with the prior art. Also, as shown in FIG. 13 and FIG. 14, the feedthrough voltage exhibits smaller amounts of variations both in the display surface and for various signal voltages than those in the prior art. In other words, in the present embodiment, direct-current voltage components between pixel electrode 104 and common electrode 106 are negligible both at all positions in the display surface and for all levels of gradation. For this reason, the embodiment can remove the disadvantage of initial display characteristics such as unevenness of brightness in the display surface and the disadvantage of reliability such as uneven display or image blotch. Additionally, in the present embodiment, the brightness of the liquid crystal display device is not reduced since the aperture ratio is not reduced.

As described above, in the first embodiment of the present invention, the formation of the transparent dielectric having a high relative permittivity on TFT side glass substrate 100 can increase the accumulated capacitance formed with pixel electrode 104 and common electrode 106. Therefore, a liquid crystal display panel can be obtained with a favorable holding characteristic and a low feedthrough voltage. Additionally, the embodiment can provide an active matrix type liquid crystal display device with satisfactory display evenness and reliability with a conventional aperture ratio maintained.

Figure 15:
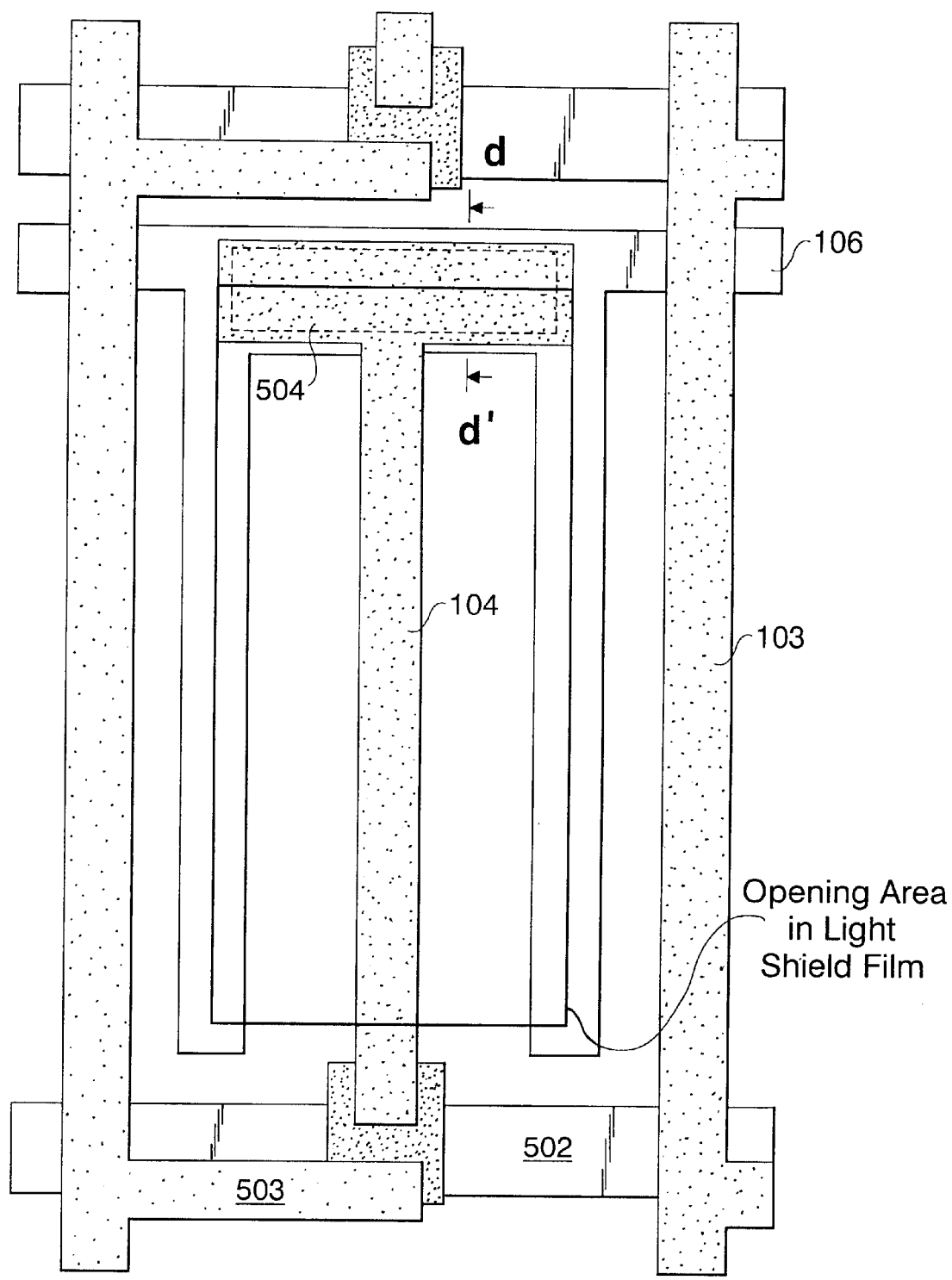
FIG. 15 is a plan view showing a unit pixel of a liquid crystal display device according to a second embodiment of the present invention.
Figure 16:
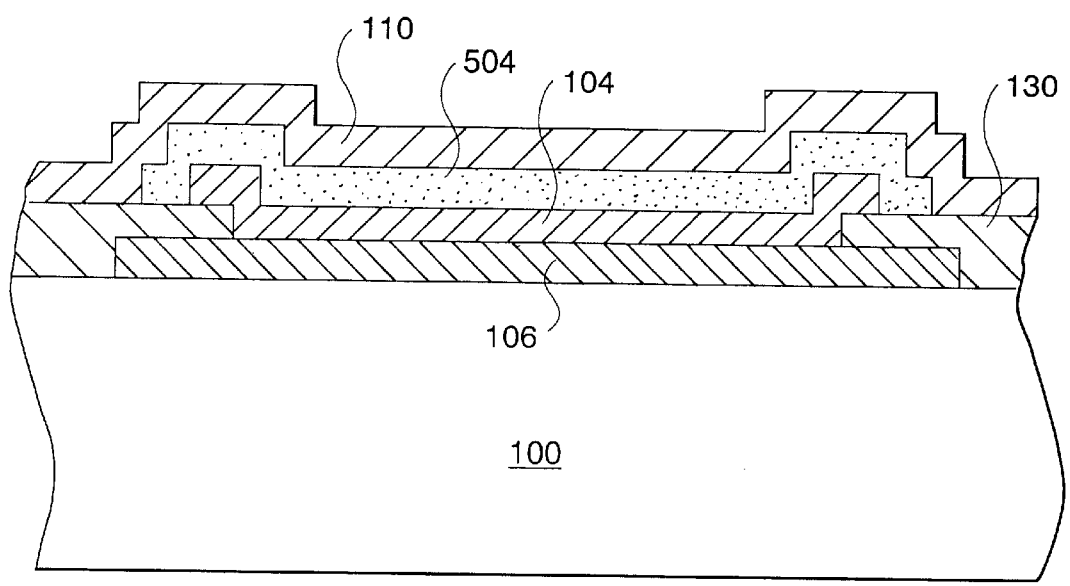
FIG. 16 is a sectional view showing the unit pixel of the liquid crystal display device taken along the line d–d' in FIG. 15.

Next, a second embodiment of the present invention will be hereinafter described with reference to FIG. 15 and FIG. 16.

In the second embodiment, unlike the aforementioned first embodiment, pixel electrode 104 has an end portion extending to overlap with common electrode 106. When interlayer insulating film 130 is formed, a slit is made in interlayer insulating film 130 inside an overlapping portion between pixel electrode 104 and common electrode 106 viewed from the direction of the normal to TFT side glass substrate 100. Also, simultaneously with the deposition of a semiconductor film for thin film transistor 503, patterning is performed to leave semiconductor film 504 in the slit portion. Other configuration is similar to that of the aforementioned first embodiment.

In the second embodiment, the formation of a-Si having a relatively high permittivity (permittivity $\epsilon \approx 12$) between pixel electrode 104 and common electrode 106 can increase the accumulated capacitance as compared with the prior art. The a-Si can be fabricated with the same number of exposures as the prior art at the patterning of TFT side substrate. This enables a liquid crystal panel with no significant reduction in the aperture ratio, a favorable holding characteristic, and a low feedthrough voltage, as well as an active matrix type liquid crystal display device with a high brightness and satisfactory display evenness and reliability.

While semiconductor film 504 is formed in the slit portion of interlayer insulating film 130 in the embodiment, the present invention is not limited to the aforementioned structure. Instead of semiconductor film 504, a transparent dielectric having a relative permittivity may be formed similarly to the aforementioned first embodiment.

Figure 17:
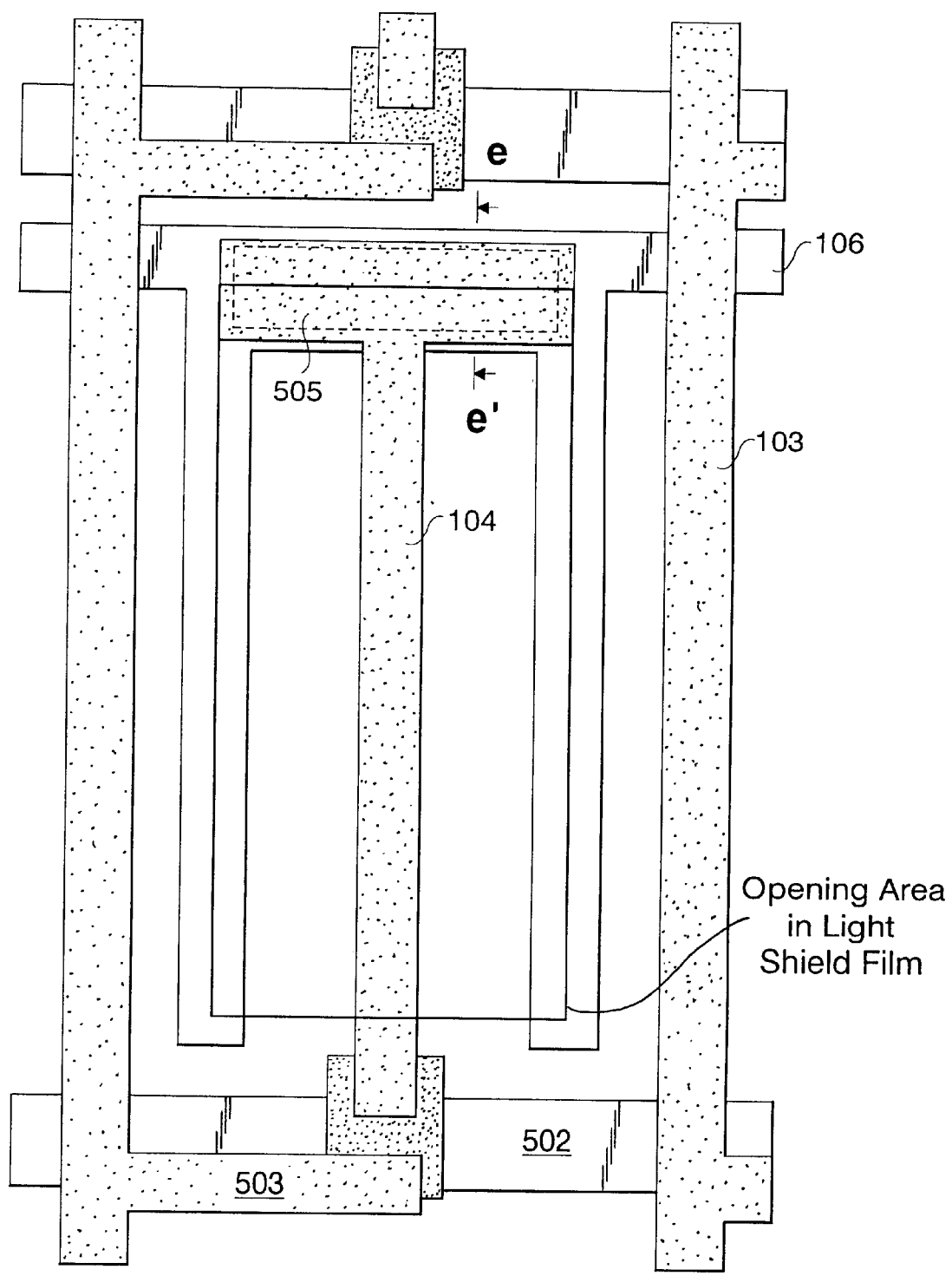
FIG. 17 is a plan view showing a unit pixel of a liquid crystal display device according to a third embodiment of the present invention.

Next, a third embodiment of the present invention will be described with reference to FIG. 17 and FIG. 18.

The present embodiment, unlike the aforementioned second embodiment, is characterized in that groove 505 in slit shape is formed with etching in a portion of TFT side glass substrate 100 below an overlapping portion between pixel electrode 104 and common electrode 106 before common electrode 106 is formed. Other steps are similar to those of the prior art.

Figure 18:
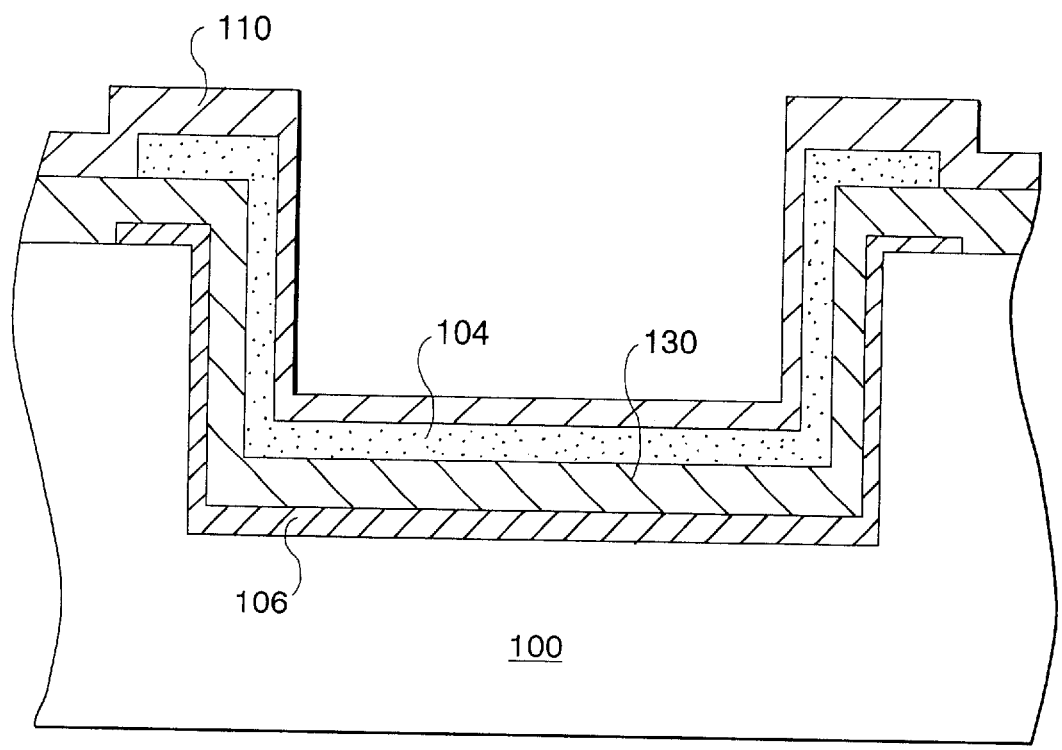
FIG. 18 is a sectional view showing the unit pixel of the liquid crystal display device taken along the line d–d' in FIG. 17.

In the present embodiment, with the aforementioned structure, pixel electrode 104, interlayer insulating film 130, and common electrode 106 can be formed on wall surfaces of groove 505 as shown in FIG. 18. This causes an increase in the area of the overlapping portion between pixel electrode 104 and common electrode 106, thereby making it possible to increase a holding capacitance formed with pixel electrode 104 and common electrode 106. Therefore, similar effects to those of the aforementioned first embodiment can be obtained.

While groove 505 in slit shape is formed in the portion of TFT side glass substrate 100 below the overlapping portion between pixel electrode 104 and common electrode 106 in the present embodiment, the present invention is not limited to the aforementioned structure. Instead, the present invention may utilize a structure having bumps and dips in TFT side glass substrate 100 such that the area of the overlapping portion between pixel electrode 104 and common electrode 106 is increased.

Figure 19:
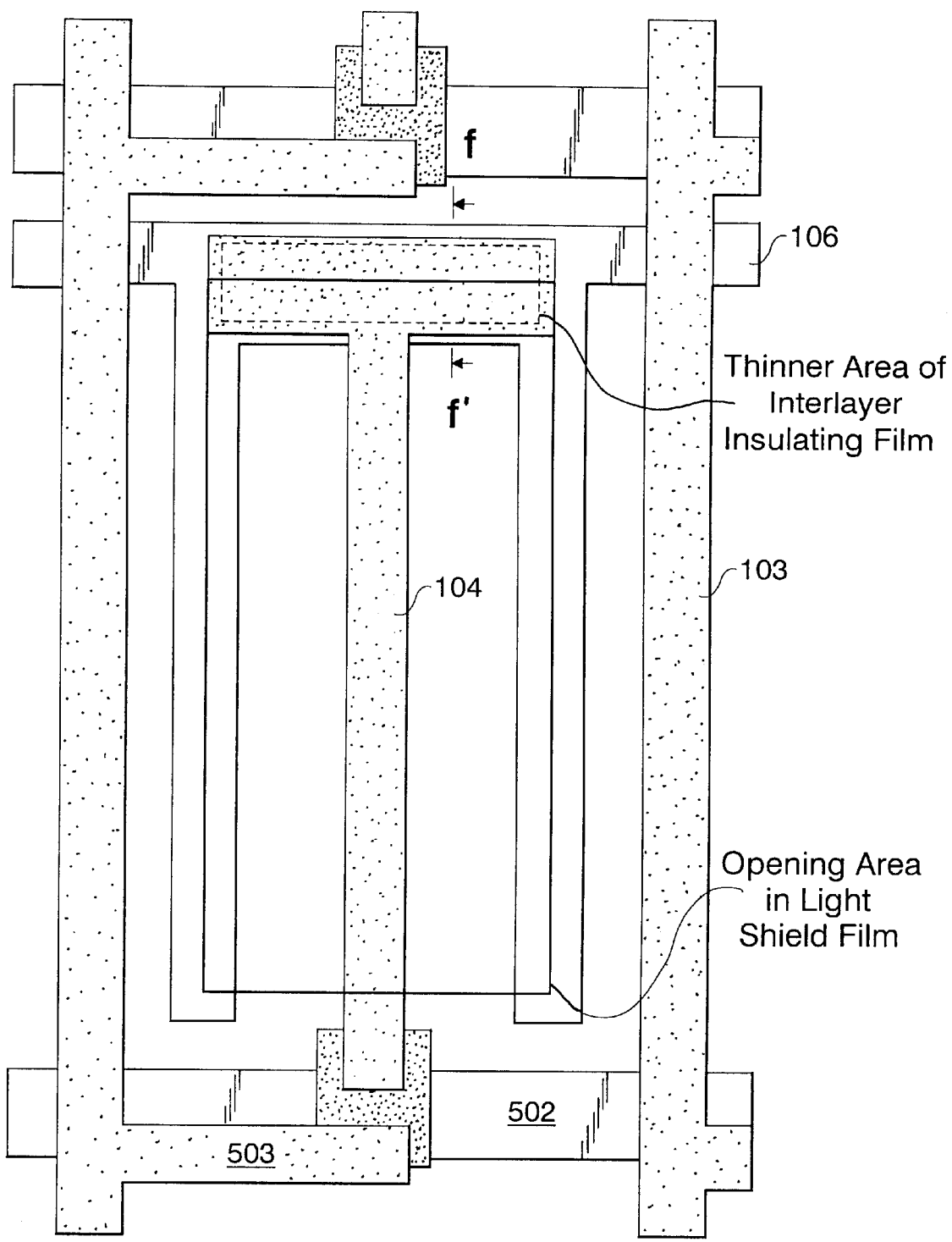
FIG. 19 is a plan view showing a unit pixel of a liquid crystal display device according to a fourth embodiment of present invention.

Next, a fourth embodiment of the present invention will be described with reference to FIG. 19 and FIG. 20.

Figure 20:
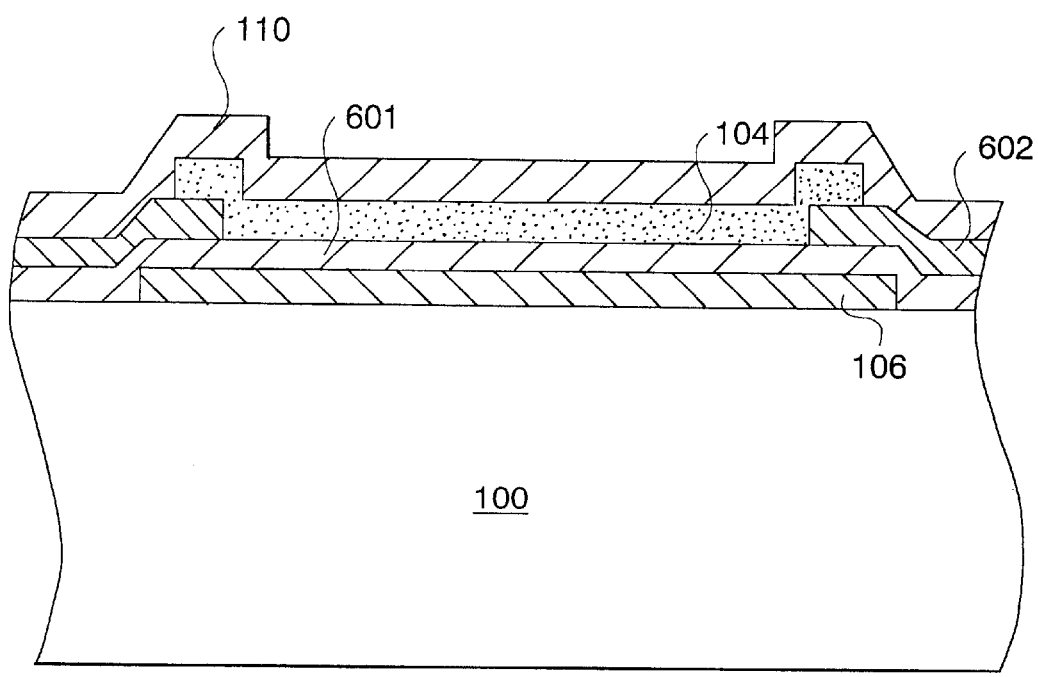
FIG. 20 is a sectional view showing the unit pixel of the liquid crystal display device taken along the line d–d' in FIG. 19.

In the embodiment, two kinds of films having a large etching rate ratio, i.e. first interlayer insulating film 601 and second interlayer insulating film 602 are laminated to serve as an interlayer insulating film as shown in FIG. 20. In an overlapping portion between pixel electrode 104 and common electrode 106, only second interlayer insulating film 602 is etched to make the interlayer insulating film thinner than in other regions.

Since the aforementioned structure can reduce the film thickness of the interlayer insulating film in the overlapping portion between pixel electrode 104 and common electrode 106 as compared with the prior art, a holding capacitance formed with pixel electrode 104 and common electrode 106 can be increased to achieve similar effects to those of the aforementioned first embodiment.

While the interlayer insulating film has a two-layer structure formed of first interlayer insulating film 601 and second interlayer insulating film 602 having different etching rates in the present embodiment, the present invention is not limited to the aforementioned structure. Instead, any structure may be used as long as it can reduce the film thickness of the interlayer insulating film in the overlapping portion between pixel electrode 104 and common electrode 106, and a laminated structure with three or more layers may be used, for example.

As described above, according to the present invention, the holding characteristic of electric charge written into the pixel electrode can be improved and the feedthrough voltage can be reduced with no significant reduction in the aperture ratio, resulting in an effect that display characteristics and reliability can be improved.

The reason is that any of the aforementioned schemes or a combination of the schemes is used to form a common electrode, a pixel electrode, and an insulating layer, thereby making it possible to increase an accumulated capacitance independent of the permittivity of the liquid crystal.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An active matrix type liquid crystal display device comprising two opposing transparent insulating substrates and liquid crystal interposed therebetween, wherein said liquid crystal is controlled by generating an electric field substantially parallel to the liquid crystal layer with a voltage applied between pixel electrodes and common electrodes both disposed on the first of said substrates, said display device further comprising:

on said first substrate:
   a plurality of scanning lines and a plurality of signal lines orthogonal to one another;
   a thin film transistor provided near each intersection of a scanning line and a signal line;
   common electrodes extending substantially parallel to said scanning lines and having a plurality of comb-tooth projections extending toward said scanning lines;
   pixel electrodes formed substantially parallel to the comb-tooth projections in gaps between the adjacent comb-tooth projections of said common electrodes when said substrate is viewed from the normal direction, at least a portion of each pixel electrode being opposite to a common electrode interposed by an interlayer insulating film;
   an interlayer insulating film disposed between said common electrodes and said pixel electrodes; and
   a first alignment film formed above said pixel electrodes interposed by a protective insulating film;

on said second substrate:
   a black matrix provided with openings in areas opposite to each of said pixel electrodes; and
   a second alignment film; and
   said active matrix type liquid crystal display device further comprising:
   accumulated capacitance increasing means for obtaining an accumulated capacitance between said pixel electrode and said common electrodes larger than that generated when said interlayer insulating film is of even thickness and flat structure.

2. The active matrix type liquid crystal display device according to claim 1, wherein said accumulated capacitance increasing means is a dielectric having a predetermined permittivity provided in the areas of said first substrate between the comb-tooth projections of said common electrodes and said pixel electrodes when the substrate is viewed from the normal direction.

3. The active matrix type liquid crystal display device according to claim 1, wherein a recess is formed in at least the portions of the upper surface of said first substrate where said common electrodes and said pixel electrodes overlap when the substrate is viewed normal direction, and said accumulated capacitance increasing means is an interlayer insulating film interposed between said common electrodes and said pixel electrodes on a wall surface of said recess.

4. The active matrix type liquid crystal display device according to claim 1, wherein said accumulated capacitance increasing means is the interlayer insulating film separating said common electrodes and pixel electrodes formed thinner in at least one portion of an area where a common electrode and a pixel electrode overlap when the substrate is viewed from the normal direction.

5. The active matrix type liquid crystal display device according to claim 1, wherein said accumulated capacitance increasing means includes an interlayer insulating film separating said common electrodes and pixel electrodes formed from a dielectric with a predetermined permitivity in at least one portion of an area where a common electrode and a pixel electrode overlap when the substrate is viewed from the normal direction.

6. The active matrix type liquid crystal display device according to claim 2, wherein said interlayer insulating film is formed from a transparent dielectric having a permittivity higher than of either of said protective insulating films and said first substrate.

7. The active matrix type liquid crystal display device according to claim 3, wherein said interlayer insulating film is formed from a transparent dielectric having a permittivity higher than of either of said protective insulating films and said first substrate.

8. The active matrix type liquid crystal display device according to claim 4, wherein said interlayer insulating film is formed from a transparent dielectric having a permittivity higher than of either of said protective insulating films and said first substrate.

9. The active matrix type liquid crystal display device according to claim 4, wherein said interlayer insulating film is a structure of at least two layers formed thinner than in other regions by removing one or more of said layers.

10. The active matrix type liquid crystal display device according to claim 5, wherein the accumulated capacitance increasing means includes a transparent dielectric with a predetermined permittivity, said transparent dielectric being formed in a slit in the interlayer insulating film, and said transparent dielectric layer having a predetermined permittivity higher than said interlayer insulating film, the protective insulating film, and said first substrate.

11. The active matrix type liquid crystal display device according to claim 6, wherein the transparent dielectric is formed of titanium oxide.

12. The active matrix type liquid crystal display device according to claim 7, wherein the transparent dielectric is formed of titanium oxide.

13. The active matrix type liquid crystal display device according to claim 8, wherein the transparent dielectric is formed of titanium oxide.

14. The active matrix type liquid crystal display device according to claim 10, wherein the transparent dielectric is formed of titanium oxide.

15. The active matrix type liquid crystal display device according to claim 10, wherein the transparent dielectric is formed from a semiconductor layer for forming said thin film transistors.

16. The active matrix type liquid crystal device according to claim 1, wherein said accumulated capacitance increasing means is at least two of:

a first accumulated capacitance increasing means, wherein said first accumulated capacitance increasing means is a dielectric having a predetermined permittivity provided in the areas of said first substrate between the comb-tooth projections of said common electrodes and said pixel electrodes when the substrate is viewed from the normal direction;

a second accumulated capacitance increasing means, wherein said second accumulated capacitance increasing means comprises a recess formed in at least the portions of the upper surface of said first substrate where said common electrodes and said pixel electrodes overlap when the substrate is viewed normal direction and said accumulated capacitance increasing means is an interlayer insulating film interposed between said common electrodes and said pixel electrodes on a wall surface of said recess;

a third accumulated capacitance increasing means, wherein said accumulated capacitance increasing means is the interlayer insulating film separating said common electrodes and pixel electrodes formed thinner in at least one portion of an area where a common electrode and a pixel electrode overlap when the substrate is viewed from the normal direction; and a fourth accumulated capacitance increasing means, wherein said accumulated capacitance increasing means includes an interlayer insulating film separating said common electrodes and pixel electrodes formed from a dielectric with a predetermined permittivity in at least one portion of an area where a common electrode and a pixel electrode overlap when the substrate is viewed from the normal direction.

* * * * *